United States Patent
Yen

(10) Patent No.: US 9,112,370 B2
(45) Date of Patent: Aug. 18, 2015

(54) RECHARGEABLE BATTERY MODULE AND BATTERY CHARGING METHOD

(71) Applicant: VIA TECHNOLOGIES, INC., New Taipei (TW)

(72) Inventor: Sheng-Hsien Yen, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 365 days.

(21) Appl. No.: 13/744,908

(22) Filed: Jan. 18, 2013

(65) Prior Publication Data

US 2013/0187608 A1    Jul. 25, 2013

Related U.S. Application Data

(60) Provisional application No. 61/588,812, filed on Jan. 20, 2012, provisional application No. 61/600,221, filed on Feb. 17, 2012.

(51) Int. Cl.
*H02J 7/02* (2006.01)
*H02J 7/00* (2006.01)

(52) U.S. Cl.
CPC .............. *H02J 7/007* (2013.01); *H02J 7/0016* (2013.01)

(58) Field of Classification Search
USPC ................................................ 320/115–121
See application file for complete search history.

(56) References Cited

U.S. PATENT DOCUMENTS

| | | | |
|---|---|---|---|
| 5,861,730 A | 1/1999 | Lee | |
| 7,633,269 B2 | 12/2009 | Chou et al. | |
| 8,299,755 B2 | 10/2012 | Shiu et al. | |
| 2005/0225305 A1 | 10/2005 | Thrap | |
| 2009/0009133 A1 | 1/2009 | Tange et al. | |
| 2009/0072793 A1* | 3/2009 | Chang et al. | 320/134 |
| 2012/0074898 A1* | 3/2012 | Schwartz | 320/107 |
| 2012/0194137 A1 | 8/2012 | Wang | |
| 2013/0015820 A1* | 1/2013 | Kim | 320/128 |

FOREIGN PATENT DOCUMENTS

| | | |
|---|---|---|
| CN | 1179640 A | 4/1998 |
| CN | 101359837 A | 2/2009 |
| CN | 101471460 A | 7/2009 |

(Continued)

OTHER PUBLICATIONS

Full English translation (machine translation) of TW201001873 (Published Jan. 1, 2010).
Full English translation (machine translation) of CN101692508 (Published Apr. 7, 2010).

(Continued)

*Primary Examiner* — Binh Tat
(74) *Attorney, Agent, or Firm* — McClure, Qualey & Rodack, LLP

(57) ABSTRACT

A rechargeable battery module including a plurality of battery cells connected in series, a charging transistor, a balancing circuit and a control chip. The charging transistor is operative to convey a charging current to charge the battery cells. Based on voltage levels of the battery cells, the control chip disables the charging transistor and controls the balancing circuit to perform a first stage battery balance process. After finishing the first stage battery balance process, the control chip enables the charging transistor to charge the battery cells again. After being switched to a constant voltage charging mode, the control chip controls the balancing circuit based on the voltage levels of the battery cells to perform a second stage battery balance process.

20 Claims, 7 Drawing Sheets

(56) References Cited

FOREIGN PATENT DOCUMENTS

| | | |
|---|---|---|
| CN | 101692508 A | 4/2010 |
| CN | 201766397 U | 3/2011 |
| CN | 102638063 A | 8/2012 |
| TW | I253195 | 4/2006 |
| TW | 201001873 A | 1/2010 |
| TW | 201032437 A | 9/2010 |

OTHER PUBLICATIONS

English Abstract translation of CN101359837 (Published Feb. 4, 2009).

English Abstract translation of CN201766397 (Published Mar. 16, 2011).

English Abstract translation of CN101471460 (Published Jul. 1, 2009).

\* cited by examiner

RECHARGEABLE BATTERY MODULE AND BATTERY CHARGING METHOD

CROSS REFERENCE TO RELATED APPLICATIONS

This application claims the benefit of U.S. Provisional Application No. 61/588,812 filed Jan. 20, 2012 and U.S. Provisional Application No. 61/600,221 filed Feb. 17, 2012, the entirety of which are incorporated by reference herein.

BACKGROUND OF THE INVENTION

1. Field of the Invention

The present invention relates to a rechargeable battery module and a battery charging method.

2. Description of the Related Art

A lithium battery is small-sized, light weight and rechargeable. Lithium batteries are often packaged in series as a rechargeable battery module used in electronic devices.

However, an over charged lithium battery may produce gas, and there is a risk of explosion. Thus, the voltage level of every battery cell of a rechargeable battery module has to be monitored. A charging procedure performed on a series of battery cells has to be stopped once the voltage of any battery cell reaches an overcharge voltage threshold. The charge capacity of the entire rechargeable battery module, therefore, is seriously reduced.

A conventional battery balancing procedure, generally, is performed when the rechargeable battery module is charged in a constant current mode (CC mode). With the constant charging current, a voltage measured between the two ends of a battery cell includes a voltage value I*R generated by the internal resistance of the battery cell. After a period of time of use, aging of each battery cells may be different, which results in unequal internal resistance. Different battery cells may have different voltage value I*R during battery balancing procedure. Thus, it is difficult to accurately balance the different battery cells by conventional battery balancing techniques.

BRIEF SUMMARY OF THE INVENTION

A rechargeable battery module and a battery charging method for a rechargeable battery model are disclosed.

A rechargeable battery module in accordance with an exemplary embodiment of the invention comprises a plurality of battery cells connected in series, a charging transistor, a balancing circuit and a control chip. The charging transistor charges the plurality of battery cells by a charging current. The balancing circuit is coupled to the plurality of battery cells to detect and balance voltage levels of the plurality of battery cells. The control chip receives the voltage values detected from the plurality of battery cells and, according to the voltage levels of the plurality of battery cells, the control chip disables the charging transistor and controls the balancing circuit to perform a first stage battery balance process. When the control chip finishes the first stage battery balance process, the charging transistor is enabled again to charge the plurality of battery cells. When switching to a constant voltage mode to charge the battery cells by the re-enabled charging transistor, the control chip controls the balancing circuit to perform a second stage battery balance process based on the voltage levels of the plurality of battery cells.

A charging method of a rechargeable battery module in accordance with an exemplary embodiment of the invention comprises the following steps: detecting voltage levels of battery cells of the rechargeable battery module, wherein the battery cells are connected in series; controlling a charging transistor of the battery charging module to charge the plurality of battery cells by a charging current; disabling the charging transistor and controlling a balancing circuit of the rechargeable battery module to perform a first stage battery balance process; enabling the charging transistor again to charge the battery cells; and, when switching to charge the battery cells in a constant voltage mode, controlling the balancing circuit to perform a second stage battery balance process based on the voltage levels of the plurality of battery cells.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
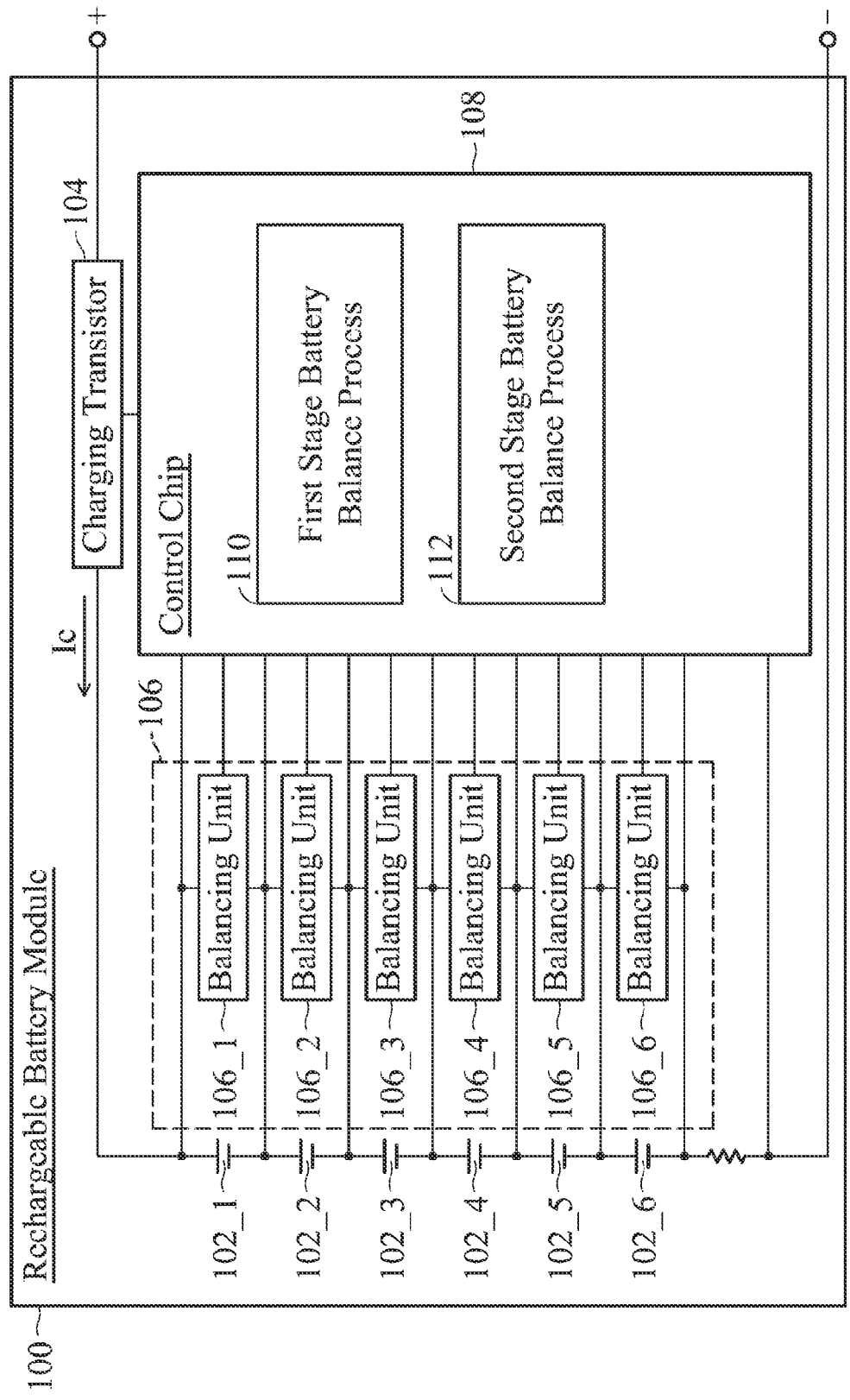
FIG. 1 depicts a rechargeable battery module 100 in accordance with an exemplary embodiment of the invention.

FIG. 1 depicts a rechargeable battery module 100 in accordance with an exemplary embodiment of the invention, comprising a plurality of battery cells 102_1 to 102_6, a charging transistor 104, a balancing circuit 106 and a control chip 108. The battery cells 102_1 to 102_6 are connected in series. The charging transistor 104 conveys a charging current Ic to charge the battery cells 102_1 to 102_6. The balancing circuit 106 is coupled to the battery cells 102_1 to 102_6 to detect and balance the voltage level of any one battery cell among the battery cells 102_1 to 102_6. The balancing circuit 106 comprises a plurality of balancing units 106_1 to 106_6. The balancing units 106_1 to 106_6 are coupled to the battery cells 102_1 to 102_6 respectively. The control chip 108 receives the voltage levels of the battery cells 102_1 to 102_6. Based on the voltage levels of the battery cells 102_1 to 102_6, the control chip 108 controls the charging transistor 104 and controls the balancing circuit 106.

When the charging transistor 104 charges the battery cells 102_1 to 102_6 by a constant current Ic (in a constant current charging mode), the control chip 108 further disables the charging transistor 104 according to the voltage levels of the battery cells 102_1 to 102_6. When the charging transistor 104 is disabled, the control chip 108 controls the balancing circuit 106 to perform a first stage battery balance process to adjust the voltage level of one of the battery cells 102_1 to 102_6. After the first stage battery balance process, the control chip 108 enables the charging transistor 104 again to charge the battery cells 102_1 to 102_6 by the constant charging current Ic. After being switched to a constant voltage charging mode, the control chip 108 may further control the balancing circuit 106 to perform a second stage battery balance process based on the voltage levels of the battery cells 102_1 to 102_6.

Figure 2:
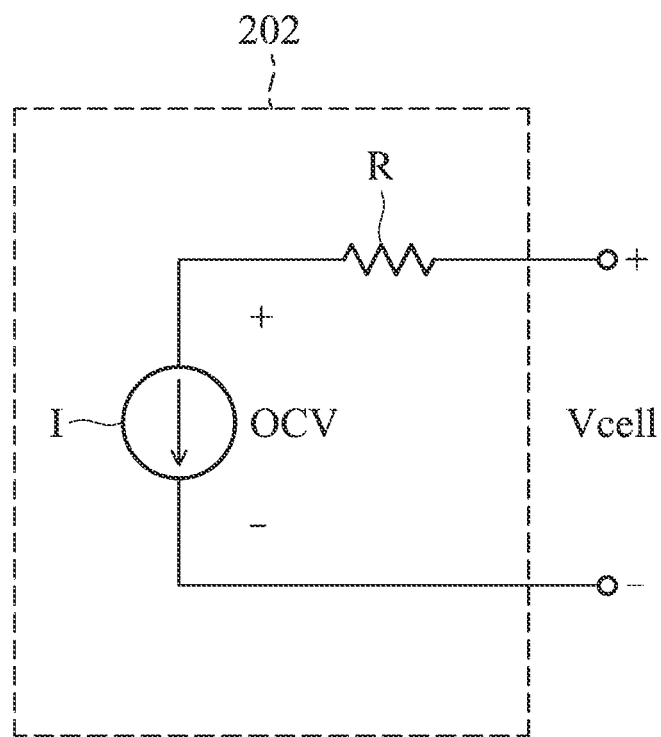
FIG. 2 depicts an equivalent module 202 for a battery cell.

An example is discussed in this paragraph, wherein the battery cell 102_1 and battery cell 102_6 are respectively provided with the highest voltage level and the lowest voltage level among the voltage levels of the battery cells 102_1 to 102_6 during the charging process. When the voltage level of the battery cell 102_1 reaches a voltage threshold, the control chip 108 disables the charging transistor 104 and stops charging the battery cells 102_1 to 102_6. When a first imbalance voltage difference between the voltage level of the battery cell 102_1 and the voltage level of the battery cell 102_6 is greater than a first balanced difference, the control chip 108 may control a balancing unit 106_1, corresponding to the battery cell 102_1, of the balancing circuit 106 to perform the first stage battery balance process on the battery cell 102_1 to balance the voltage level of the battery cell 102_1. In an exemplary embodiment, the control chip 108 may estimate a first adjustment target based on the first imbalance voltage difference and the first balanced difference. Note that the first imbalance voltage difference is the difference between the voltage level of the battery cell 102_1 and the voltage level of the battery cell 102_6 before the charging transistor 104 is disabled. Preferably, the first adjustment target is a voltage difference between the first imbalance voltage difference and the first balanced difference. Further, after the charging transistor 104 is disabled, the control chip 108 may record the voltage level of the battery cell 102_1 as a first voltage reference. The voltage level of the battery cell 102_1 decreases gradually by performing the first stage battery balance process. When the voltage level of the battery cell 102_1 drops by the first adjustment target after the disabling of the charging transistor 104, the control chip 108 controls the balancing circuit 106 (i.e. balancing unit 106_1) to stop balancing the battery cell 102_1 and thereby finishes the first stage battery balance process. Note that the internal resistances of battery cells 102_1 to 102_6 are taken into account of the termination of the first stage battery balance process. Thus, the voltage levels of the battery cells 102_1 to 102_6 are protected from exceeding the voltage threshold again when the charging transistor 104 is enabled again. The charging transistor 104 is protected from being unexpectedly disabled again to break off the further charging of the battery cells 102_1 to 102_6. With reference to FIG. 2, how the internal resistances of the battery cells are taken into account to avoid unexpectedly disabling the charging transistor 104 again is discussed later.

FIG. 2 depicts an equivalent module 202 of a battery cell. The voltage level of battery cell is Vcell, and depends on an open circuit voltage OCV of the battery cell and a voltage generated by the internal resistance R, where the voltage is I*R, and I is a current passing the battery cell. Thus, Vcell=OCV+I*R. Because the current I does exist in a constant current charging mode, the voltage level Vcell of each battery cell depends on the internal resistance of each battery cell. Obviously, the voltage level, (OCV+I*R), of a battery cell with a charging current is different from the voltage level, OVC, of a battery cell without any charging current. Because the charging current is constant and the internal resistance is not controllable, the control chip 108 controls the balancing circuit 106 to balance the voltage levels of different battery cells by controlling (i.e. reduces) the open circuit voltage OCV. In order to take the internal resistances of battery cells 102_1 to 102_6 into account, a first adjustment target is estimated based on a voltage difference measured when the charging transistor is enabled (e.g., the first imbalance voltage difference). When the voltage level of the battery cell 102_1 drops from a first voltage reference (i.e. the open circuit voltage) by the first adjustment target, the first stage battery balance process may be finished. Because the open circuit voltage OCV is reduced in the first stage battery balance process, the voltage level of the battery cell 102_1 is (OCV+I*R), lower than the voltage threshold, when the charging transistor is enabled again, which is low enough to prolong the charging procedure for the other battery cells before the voltage level of the battery cell 102_1 exceeds the voltage threshold again. According to the aforementioned technique, using the voltage level of the battery cell 102_1 measured when the charging transistor 104 is disabled as a reference voltage level and terminating the first stage battery balance process when a first adjustment target dependent on the internal resistances is achieved, the internal resistances of the battery cells 102_1 to 102_6 are taken into account in the first stage battery balance process. A prolonged charging procedure for balanced voltage levels between the battery cells is guaranteed.

After the first stage battery balance process, the control chip 108 enables the charging transistor 104 again and uses the same charging current Ic to charge the battery cells 102_1 to 102_6. After the charging transistor 104 is enabled again, the control chip 108 continues to monitor the voltage levels of the battery cells 102_1 to 102_6. When a total voltage level of the battery cells 102_1 to 102_6 reaches a charging mode switch threshold, the control chip 108 controls the charging transistor 104 to charge the battery cells 102_1 to 102_6 in a constant voltage charging mode. The charging current Ic output from the charging transistor 104 decreases gradually. When the charging current Ic drops to a taper current, the charging of the battery cells 102_1 to 102_6 is finished.

Note that after the charging of the battery cells is finished, the control chip 108 further controls the balancing circuit 106 based on the voltage levels of the battery cells 102_1 to 102_6 to perform a second stage battery balance process. An example is discussed, wherein the battery cell 102_2 and battery cell 102_6 are respectively provided with the highest voltage level and the lowest voltage level among the voltage levels of the battery cells 102_1 to 102_6 when the re-enabled charging transistor 104 finishes the charging of the battery cells. When a second imbalance voltage difference between the voltage level of the battery cell 102_2 and the voltage level of the battery cell 102_6 is greater than a second balanced difference, the control chip 108 controls a balancing unit 106_2, corresponding to the battery cell 102_2, of the balancing circuit 106 to perform the second stage battery balance process on the battery cell 102_2, to adjust the voltage level of the battery cell 102_2 for voltage balance between the different battery cells. In an exemplary embodiment, the control chip 108 may estimate a second adjustment target based on the second imbalance voltage difference (a voltage difference between the voltage level of the battery cell 102_2 and the voltage level of the battery cell 102_6) and the second balanced difference. Preferably, the second adjustment target may be a voltage difference between the second imbalance voltage difference and the second balanced difference. Because the battery cell 102_2 is at the greatest voltage level among the battery cells 102_1 to 102_6 when the charging of the battery cells is finished (e.g. the charging current Ic drops to the taper current), the control chip 108 controls the balancing unit 106_2 to perform the second stage battery balance process on the battery cell 102_2. Note that the target battery cell to be balanced by the second stage battery balance process (e.g. the battery cell 102_2) is not limited to be different from the target battery cell to be balanced by the first stage battery balance process (e.g. the battery cell 102_1). In another case wherein the target battery cell of the first stage battery balance process is still provided with the highest voltage level at the end of the charging of the battery cells, and the second stage battery balance process is performed on the same battery cell.

Further, at the beginning the second stage battery balance process, the voltage level of the battery cell 102_2 may be recorded as a second voltage reference by the control chip 108. The voltage level of the battery cell 102_2 decreases gradually by performing the second stage battery balance process. When the voltage level of the battery cell 102_2 drops from the second voltage reference by the second adjustment target, the control chip 108 disables the balancing unit 106_2, corresponding to the battery cell 102_2, of the balancing circuit 106 to finish the second stage battery balance process. In comparison with the first balanced difference, the second balanced difference is smaller than the first balanced difference. Note that when the charging of the battery cells is finished, the charging current is very small (i.e., lower than a taper current), and the voltage levels of the battery cells 102_1 to 102_6 are around the open circuit voltages thereof and should be adjusted for balance between the different battery cells. Thus, the first stage battery balance process is designed to roughly balance the battery cells and the second stage battery balance process is designed to finely balance the battery cells. The balancing speed and efficiency of the battery cells are improved by the first stage and second stage battery balance processes.

In summary, to prevent an unexpected over charge protection and to achieve a real balance between the battery cells, the battery cells are balanced in two stages in this disclosure and the termination criteria for the different stages are different. For the first stage battery balance process, a loose termination criterion may be provided, to guarantee the switching from the constant current charging mode to the constant voltage charging mode. For the second stage battery balance process, a strict termination criterion may be provided, to make the open circuit voltages of the battery cells equal when the battery cells are full charged.

The control chip 108 may be implemented by hardware or hardware and software co-designed. In an exemplary embodiment of the control chip 108, a computing unit is provided to execute firmware to perform the first and second stage battery balance processes. The codes of the firmware may be stored in a read only memory (ROM) of the control chip 108. As shown in FIG. 1, the control chip 108 may execute a first stage battery balance process 110 with consideration of an internal resistance of a battery cell, and may further execute a second stage battery balance process 112 to finely balance the battery cells when a cut-off condition of the charging of the battery cells is satisfied (i.e., the charging current Ic is lower than a taper current Itaper).

Figure 3:
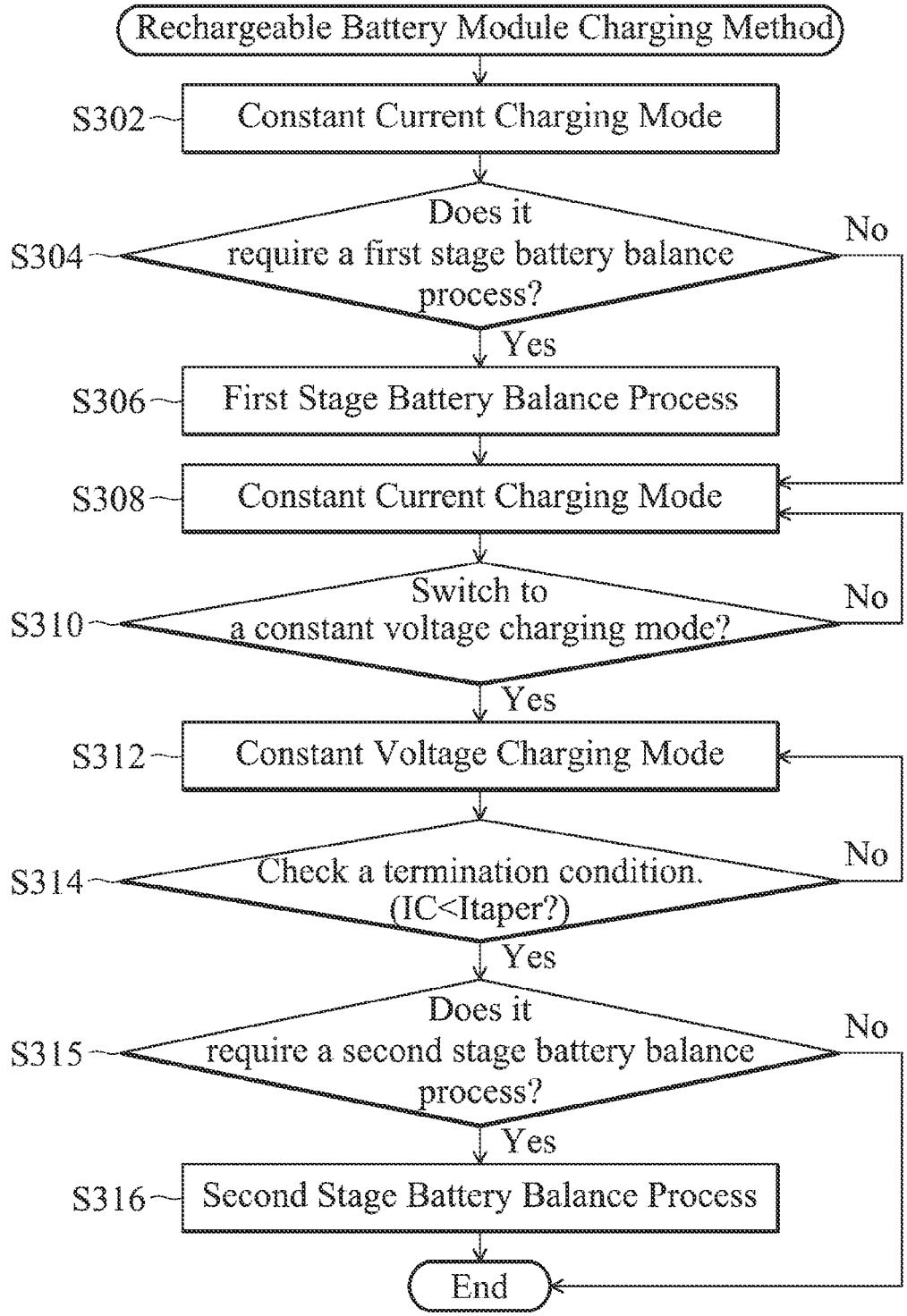
FIG. 3 is a flowchart of a charging method of a rechargeable battery module in accordance with an exemplary embodiment of the invention.

FIG. 3 is a flowchart depicting a charging method of a rechargeable battery module in accordance with an exemplary embodiment of the invention, and may be executed by the control chip 108. In step S302, the rechargeable battery module is charged in a constant current charging mode. In step S304, it is checked whether a first stage battery balance process is required when the rechargeable battery module is charged by a constant current. If not, the constant current charging mode may be maintained (step S308). On the contrary, the step S306 is performed to execute a first stage battery balance process. When the first stage battery balance process is finished, the step S308 is performed to continue charging the rechargeable battery module in the constant current charging mode. In step S310, it is checked whether the rechargeable battery module should be switched to a constant voltage charging mode. When there is no need to switch to the constant voltage charging mode, the rechargeable battery module is kept being charged by the constant current (S308). When switched to the constant voltage charging mode, the step S312 is performed to charge the rechargeable battery module according to a constant voltage. In step S314, according to whether the charging current Ic drops to a taper current (Itaper), it is determined whether charging of the battery cells is finished. When the charging current Ic drops to the taper current Itaper, the step S315 is performed. In step S315, it is determined whether a second stage battery balance process is required. If yes, the step S316 is performed for executing a second stage battery balance process. When there is no need for a second stage battery balance process, the process ends.

Figure 4:
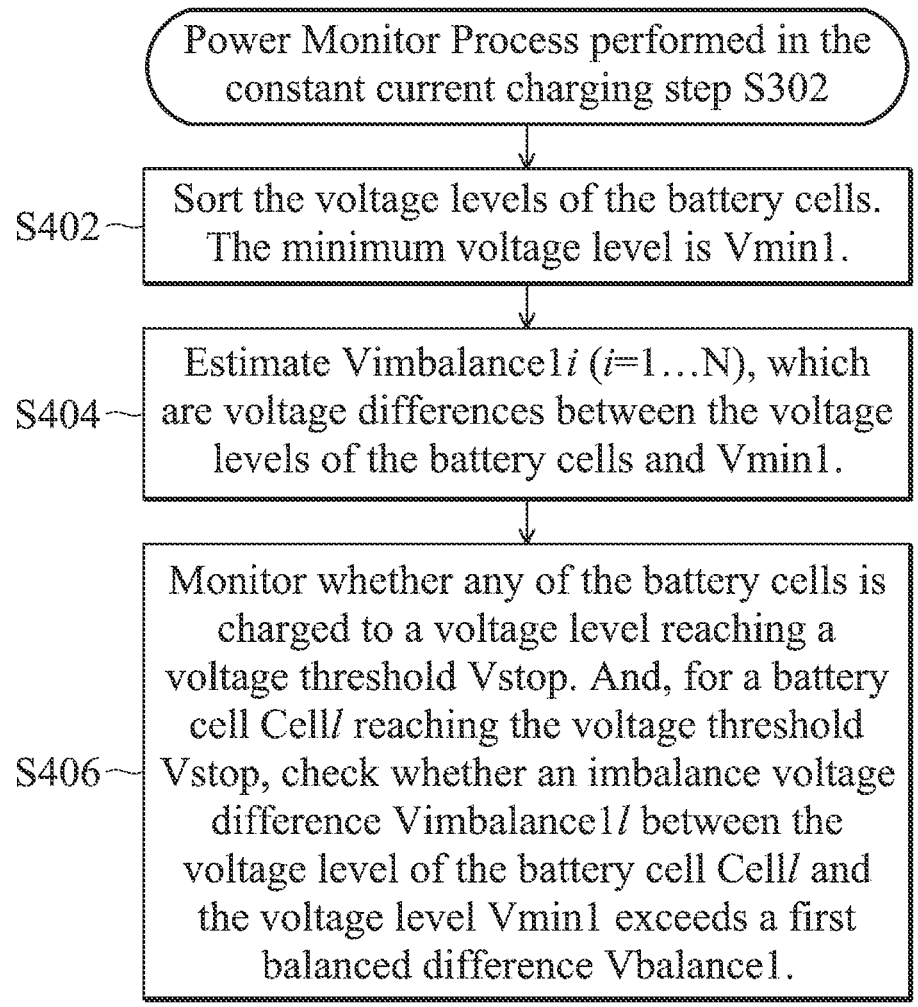
FIG. 4 is a flowchart depicting a power monitor process performed in the constant current charging operation of step S302.

The constant current charging operation of step S302 further includes a power monitor process. FIG. 4 is a flowchart depicting the power monitor process performed by the constant current charging operation of step S302. In step S402, the battery cells are sorted by voltage levels. The lowest voltage level is Vmin1. In step S404, voltage differences between the voltage levels of the battery cells and the lowest voltage level Vmin1 are estimated as imbalance voltage differences Vimbalancei, i=1~N, and N is the total amount of the battery cells. In step S406, it is monitored whether any of the battery cells is charged to a voltage level reaching a voltage threshold Vstop. Further, for the voltage level of battery cell CellI reaching the voltage threshold Vstop, an imbalance voltage difference VimbalanceI/ between the voltage level of the battery cell CellI and the voltage level Vmin1 is estimated and compared with a first balanced difference Vbalance1 in step S406. The first balanced difference Vbalance1 may be set by the manufacturer. The monitor operation performed in step S406 may be used in step S304 of FIG. 3 to determine whether a first stage battery balance process (of step S306) is required. When the battery cell CellI exceeding the voltage threshold Vstop has an imbalance voltage difference VimbalanceI/ greater than the first balanced difference Vbalance1, the battery cell CellI is regarded as the target battery cell that should be adjusted by a first stage battery balance process.

Figure 5:
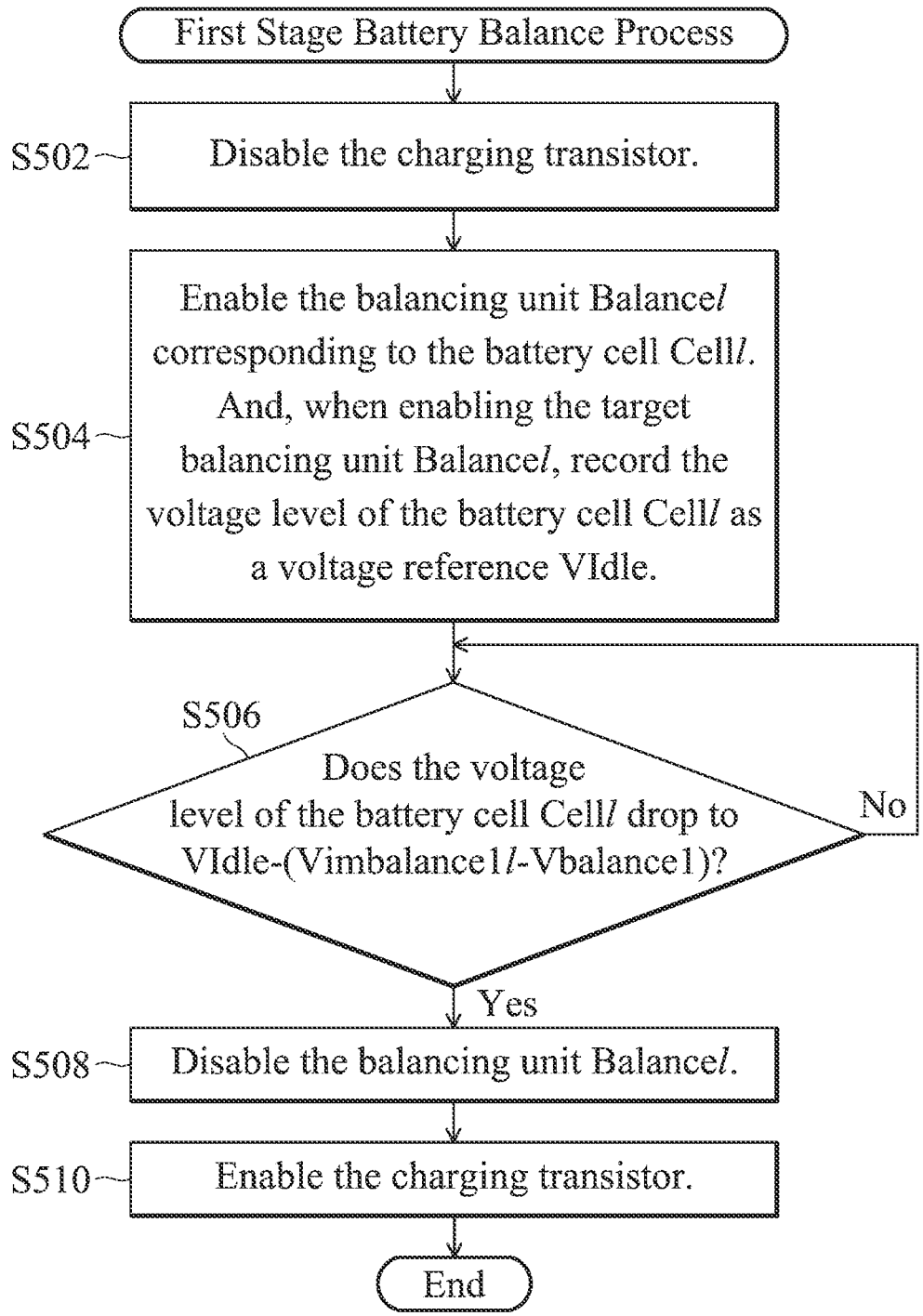
FIG. 5 is a flowchart depicting a first stage battery balance process of step S306 in detail.

As for the first stage battery balance process of step S306, it is discussed in detail with reference to the flowchart of FIG. 5. In step S502, the charging transistor (104 of FIG. 1) of the rechargeable battery module is disabled to stop conveying the charging current Ic. In step S504, the balancing unit BalanceI (i.e. the target balancing unit) corresponding to the target battery cell CellI is enabled to balance the voltage level of the target battery cell CellI. Further, in step S504, the voltage level of the target battery cell CellI is recorded as a voltage reference VIdle when the target balancing unit BalanceI is enabled. In step S506, the voltage level of the target battery cell CellI is monitored to check whether the voltage level of the target battery cell CellI drops by an adjustment target (Vimbalance1*l*−Vbalance1). The adjustment target is a voltage difference between the imbalance voltage difference Vimbalance1*l* and the balanced difference Vbalance1. Step S506 is repeated to monitor voltage level of the target battery cell Cell1 until the voltage level of the target battery cell Cell1 drops by the adjustment target. When the target battery cell Cell1 drops to VIdle−(Vimbalance1*l*−Vbalance1), step S508 is performed to shut down the target balancing unit Balance1. In step S510, the charging transistor 104 is enabled again and the first stage battery balance process is finished. Referring to the voltage criterion VIdle−(Vimbalance1*l*−Vbalance1) for terminating the first stage battery balance process, the imbalance voltage difference Vimbalance1*l* is measured in the constant current charging mode before disabling the charging transistor. According to the equivalent module of a battery cell, the imbalance voltage difference Vimbalance1*l* is a voltage difference between the voltage level, (OCV+I*R), of the target battery cell Cell1 and the voltage value Vmin1 in the constant charging mode. Thus, the imbalance voltage difference Vimbalance1*l* is related to the internal resistance of the target battery cell Cell1. In the present invention, the imbalance voltage difference Vimbalance1*l* is utilized in controlling the first stage battery balance process in which no charging current exists (because the charging transistor 104 is disabled in the first stage battery balance process). Thus, the internal resistance of the battery cell is taken into account in the first stage battery balance process. The disclosed technique is more effective than conventional battery balance techniques. Note that after the target balancing unit Balance1 is enabled, the voltage reference VIdle of the target battery cell Cell1 is measured when there is no charging current, so that the voltage reference VIdle is independent of the internal resistance of the target battery cell Cell1.

Figure 6:
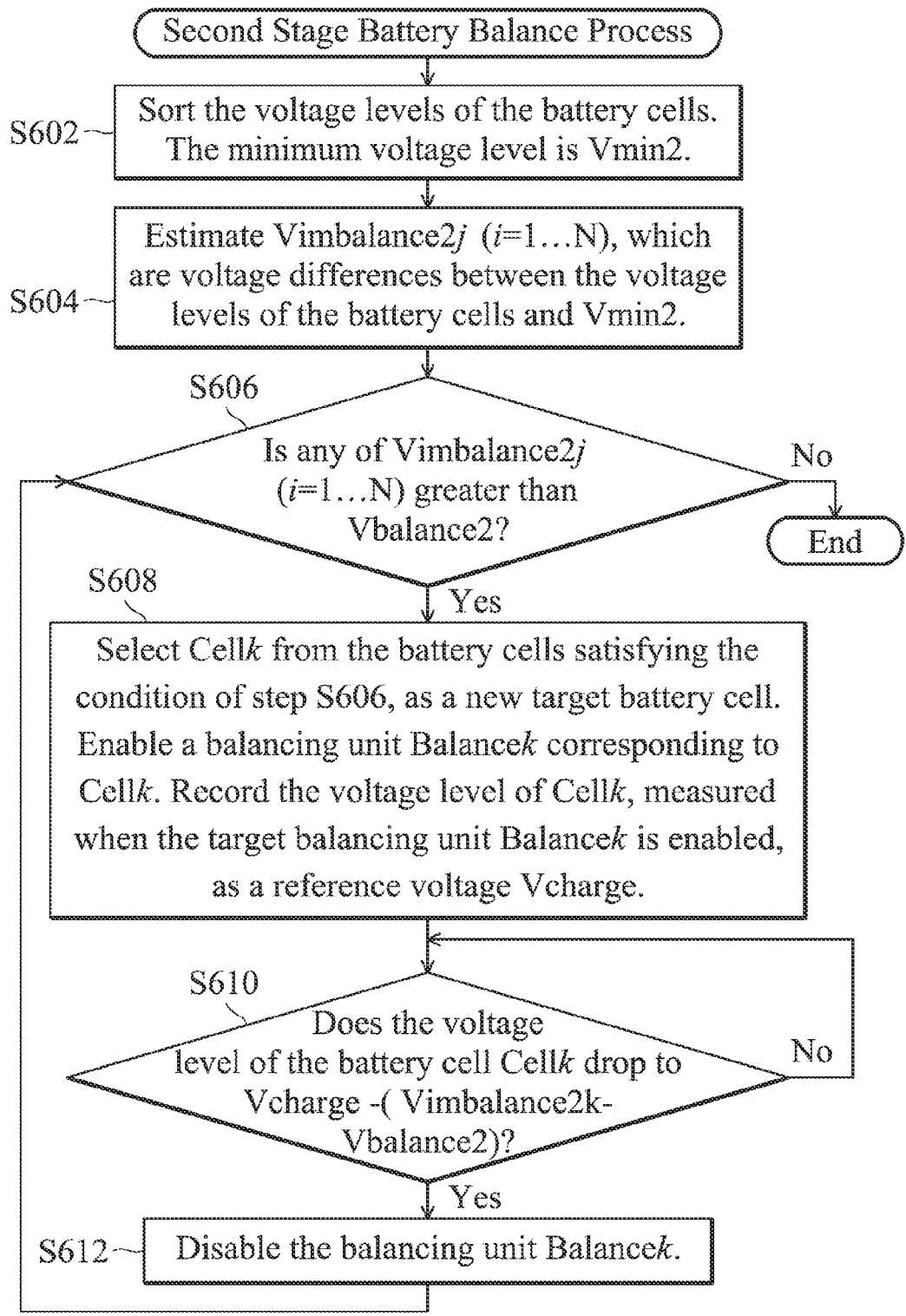
FIG. 6 is a flowchart depicting a second stage battery balance process of step S316.

As for the second stage battery balance process of step S316, it is discussed in detail with reference to the flowchart of FIG. 6. In step S602, the voltage levels of the battery cells are sorted, and the minimum voltage level is Vmin2. In step S604, voltage differences between the voltage cells and the minimum voltage level Vmin2 are estimated, and thereby Vimbalance2*j*, j=1~N are estimated. In step S606, it is monitored whether any of the imbalance voltage differences Vimbalance2*j* (j=1~N) is greater than a second balanced difference Vbalance2 (may be set by the manufacturer). If yes, step S608 is performed, wherein one of the battery cells satisfying the condition of step S606 is selected (e.g., a battery cell Cellk is selected) as a new target battery cell, and a balancing unit Balancek (i.e. a new target balancing unit) is enabled, and the voltage level of the target battery cell Cellk is measured when the target balancing unit Balancek is enabled as a reference voltage Vcharge. In step S610, the target battery cell Cellk is monitored to check whether the voltage level of the target battery cell Cellk drops from the reference voltage Vcharge by an adjustment target (Vimbalance2*k*−Vbalance2). The adjustment target (Vimbalance2*k*−Vbalance2) is a voltage difference between the imbalance voltage difference Vimbalance2*k* of the target battery cell Cellk and the second balanced difference Vbalance2. Step S610 is repeated to monitor the target battery cell Cellk until the voltage level of the target battery cell Cellk drops by the adjustment target. When the target battery cell Cellk drops to lower than Vcharge−(Vimbalance2*k*−Vbalance2), step S512 is performed to shut down the target balancing unit Balancek. Step S606 is repeated until all battery cells with imbalance voltage differences greater than the second balanced difference Vbalance2 are adjusted and then the second stage battery balance is finished.

Figure 7:
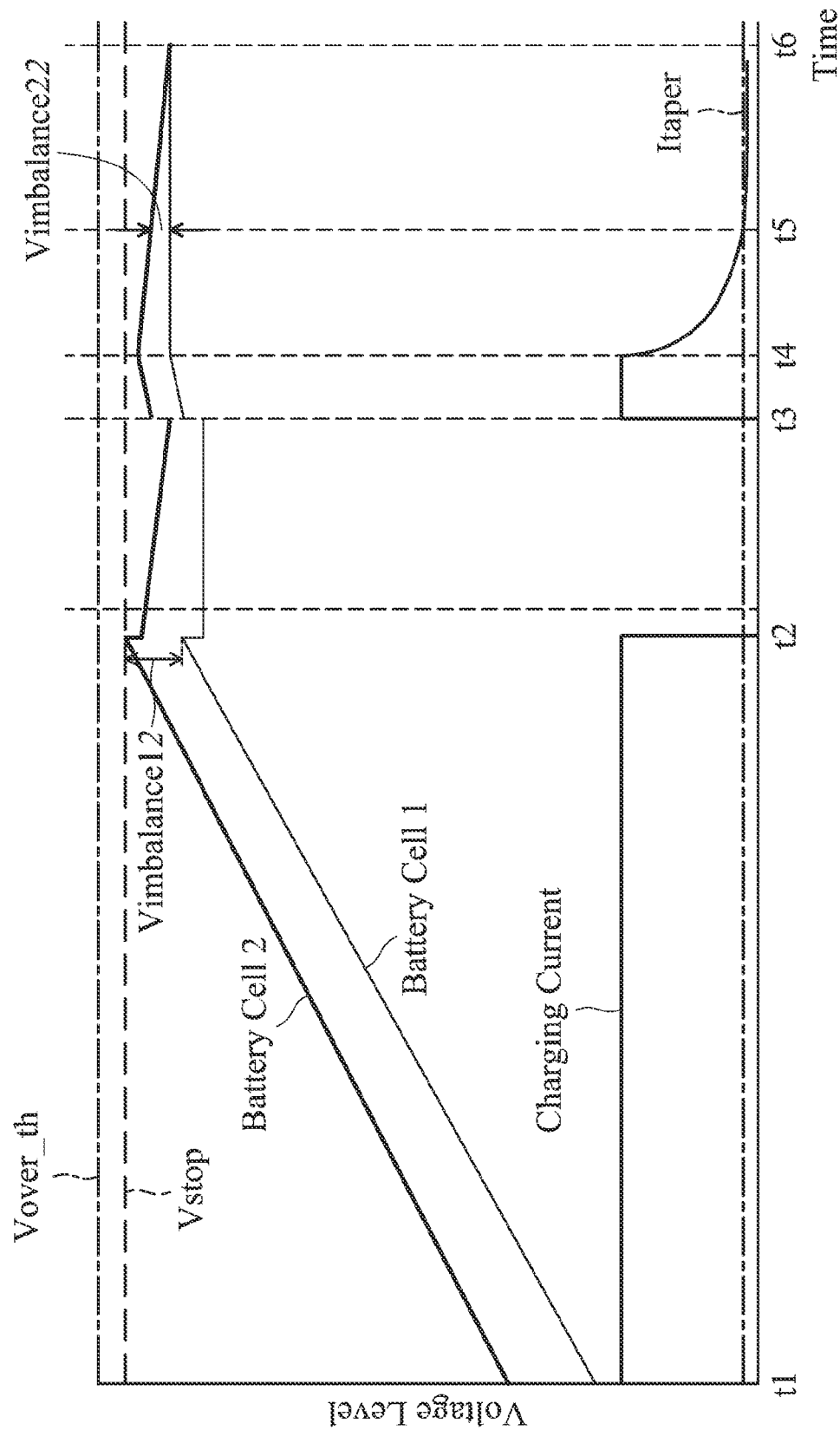
FIG. 7 shows how two battery cells are charged in accordance with an exemplary embodiment of the invention, wherein a constant current charging process is performed from t1 to t2, a first stage battery balance process is performed from t2 to t3, the constant current charging process is performed once again from t3 to t4, a constant voltage charging process is performed from t4 to t5, and a second stage battery balance process is performed from t5 to t6.

FIG. 7 shows how two battery cells are charged in accordance with an exemplary embodiment of the invention. In time t1 to t2, the battery cell 1 and battery cell 2 connected in series are charged by a constant current. At time point t2, the voltage level of the battery cell 2 reaches a voltage threshold Vstop and the imbalance voltage difference Vimbalance12 of the battery cell 2 is greater than the first balanced difference Vbalance1, so that the first stage battery balance process is performed. Note that the voltage threshold Vstop may be lower than an over charge voltage Vover_th. When any battery cell is charged to be greater than the over charge voltage Viver_th, an over charge protection mechanism may be triggered to stop charging all battery cells. At time point t3, the voltage level of the battery cell 2 is lowered down by (Vimbalance12−Vbalance1) so that the first stage battery balance process is finished and the constant current charging current is conveyed to the battery cells again. At time point t4, a total voltage level of the battery cells 1 and 2 reaches a charging mode switch threshold, so that the charging mode is switched to a constant voltage charging mode and the charging current decreases. At time point t5, the charging current is lower than a taper current Itaper, wherein a termination condition of the charging of the battery cells is satisfied. Next, it is determined whether a second stage battery balance process is required. As shown, because the imbalance voltage difference Vimbalance22 of the battery cell 2 exceeds a second balanced difference Vbalance2, the battery cell 2 is regarded as a target battery cell requiring voltage level adjustment. At time point t6, the voltage level of the battery cell 2 drops by (Vimbalance22−Vbalance2) so that the second stage battery balance process is finished. In conclusion, a constant current charging process is performed from t1 to t2, a first stage battery balance process is performed from t2 to t3, the constant current charging process is performed once again from t3 to t4, a constant voltage charging process is performed from t4 to t5, and a second stage battery balance process is performed from t5 to t6. In this manner, the balance between the battery cells is not unexpectedly terminated according to the voltage threshold Vstop. Further, when setting the first balanced difference Vbalance1 to be greater than the second balanced difference Vbalance2, the first stage battery balance process is for rough adjustment and the second stage battery balance process is for fine adjustment. The time consumed in balancing the different battery cells is considerably shortened. Further, a first balanced difference Vbalance1 larger than Vbalance2 protects the battery cells from a reversed balancing. A reversed balancing is due to the IR effect of the battery cells. For example, if an imbalance voltage difference Vimbalance1*l* measured before the first stage battery balance process is 40 mV and Vimbalance1*l* contains a voltage difference 15 mV due to IR effect (i.e., I*R1−I*R2=15 mV), the actual capacity difference between two battery cells 1 and 2 is OCV1−OCV2=40 mV−15 mV=25 mV. If the first balanced difference Vbalance1 is set to be quite low, for example, 5 mV, the open circuit voltage OCV1 has to decrease sharply to make OCV1−OCV2 to −10 mV and thus (OCV1−OCV2)+(I*R1−I*R2) does not exceed Vbalance1(=5 mV) while the voltage level due to IR effect is not adjustable. The imbalance voltage difference, −10 mV, between the actual capacity OCV1 of the battery cell 1 and the actual capacity OCV2 of the battery cell 2 has to be adjusted back in the second stage battery balance process. The back and forth adjustment results in a waste of time and energy. Setting the first balanced difference Vbalance1 to be large enough is a preferred solution.

Note that the present invention is not limited to the two-stage approach for battery balance. In some embodiments, the second stage battery balance process may be omitted and only the first stage battery balance process is adopted. Any battery balance process terminated according to voltage levels of battery cells measured in a constant current charging mode should be considered as an exemplary embodiment of the disclosure.

In addition to the rechargeable battery module which is a device implemented in accordance with the invention, a charging method for a rechargeable battery module is further disclosed in accordance with the disclosure, performed on a plurality of battery cells of a rechargeable battery module.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A rechargeable battery module, comprising:
    a plurality of battery cells, connected in series;
    a charging transistor, conveying a charging current to charge the plurality of battery cells;
    a balancing circuit, coupled to the plurality of battery cells, detecting and balancing voltage levels of the plurality of battery cells; and
    a control chip, receiving the voltage levels of the plurality of battery cells, wherein, based on the voltage levels of the plurality of battery cells, the control chip disables the charging transistor to end charging the plurality of battery cells by a first constant current charging stage and controls the balancing circuit to perform a first stage battery balance process,
    wherein:
    the control chip further enables the charging transistor again to charge the plurality of battery cells by a second constant current charging stage after the first stage battery balance process is finished;
    the control chip is further switched to charge the plurality of battery cells in a constant voltage charging mode after the second constant current charging stage is finished; and
    after ending the constant voltage charging mode, the control chip further performs a second stage battery balance process based on the voltages levels of the plurality of battery cells.

2. The rechargeable battery module as claimed in claim 1, wherein:
    when a first voltage level of a first battery cell among the plurality of battery cells reaches a voltage threshold and a first imbalance voltage difference, between the first voltage level and a lowest voltage level of the plurality of battery cells, exceeding a first balanced difference is obtained, the control chip disables the charging transistor and performs the first stage battery balance process; and
    the first voltage level is a voltage level of the first battery cell before the charging transistor is disabled.

3. The rechargeable battery module as claimed in claim 2, wherein:
    after the charging transistor is disabled, the control chip further records the voltage level of the first battery cell as a first voltage reference;
    when the voltage level of the first battery cell drops from the first voltage reference by a first adjustment target, the control chip controls the balancing circuit to finish the first stage battery balance process; and
    the first adjustment target is a difference between the first imbalance voltage difference and the first balanced difference.

4. The rechargeable battery module as claimed in claim 2, wherein:
    when a second imbalance voltage difference, between a second voltage level and a lowest voltage level of the plurality of battery cells, exceeding a second balanced difference is obtained, the control chip controls the balancing circuit to perform the second stage battery balance process; and
    the second voltage level is a voltage level of a second battery cell among the plurality of battery cells.

5. The rechargeable battery module as claimed in claim 4, wherein:
    the control chip controls the balancing chip to perform the second stage battery balance process when the second imbalance voltage difference is obtained after the charging current drops to a taper current.

6. The rechargeable battery module as claimed in claim 4, wherein:
    when starting to perform the second stage battery balance process, the control chip further records the voltage level of the second battery cell as a second voltage reference;
    when the voltage level of the second battery cell drops from the second voltage reference by a second adjustment target, the control chip controls the balancing circuit to finish the second stage battery balance process; and
    the second adjustment target is a difference between the second imbalance voltage difference and the second balanced difference.

7. The rechargeable battery module as claimed in claim 4, wherein the second balanced difference is less than the first balanced difference.

8. The rechargeable battery module as claimed in claim 4, wherein the second battery cell is the first battery cell.

9. The rechargeable battery module as claimed in claim 1, wherein:
    the control chip controls the balancing circuit to charge the plurality of battery cells in the constant voltage charging mode when a total voltage level of the plurality of battery cells reaches a charging mode switch threshold after the charging transistor is enabled again.

10. The rechargeable battery module as claimed in claim 9, wherein:
    before the total voltage level reaches the charging mode switch threshold, the control chip controls the charging transistor to charge the plurality of battery cells in a constant current charging mode.

11. A rechargeable battery module charging method, comprising:
    detecting voltage levels of a plurality of battery cells connected in series in a rechargeable battery module;
    controlling a charging transistor of the rechargeable battery module to convey a charging current to charge the plurality of battery cells;
    based on the voltage levels of the plurality of battery cells, disabling the charging transistor to end charging the plurality of battery cells by a first constant current charging stage and controlling a balancing circuit of the rechargeable battery module to perform a first stage battery balance process;
    enabling the charging transistor again to charge the plurality of battery cells by a second constant current charging stage after the first stage battery balance process is finished;

switching to charge the plurality of battery cells in a constant voltage charging mode after the second constant current charging stage is finished; and after ending the constant voltage charging mode, performing a second stage battery balance process based on the voltages levels of the plurality of battery cells.

12. The method as claimed in claim 11, wherein:

the charging transistor is disabled and the first stage battery balance process is performed when a first voltage level of a first battery cell among the plurality of battery cells reaches a voltage threshold and a first imbalance voltage difference, between the first voltage level and a lowest voltage level of the plurality of battery cells, exceeding a first balanced difference is obtained; and the first voltage is a voltage level of the first battery cell before the charging transistor is disabled.

13. The method as claimed in claim 12, further comprising:

after the charging transistor is disabled, recording the voltage level of the first battery cell as a first voltage reference; and controlling the balancing circuit to finish the first stage battery balance process when the voltage level of the first battery cell drops from the first voltage reference by a first adjustment target, wherein the first adjustment target is a difference between the first imbalance voltage difference and the first balanced difference.

14. The method as claimed in claim 12, wherein:

the balancing circuit is controlled to perform the second stage battery balance process when a second imbalance voltage difference, between a second voltage level and a second balanced difference, exceeding a second balanced difference is obtained; and the second voltage level is a voltage level of a second battery cell among the plurality of battery cells.

15. The method as claimed in claim 14, wherein:

the second stage battery balance process is performed when the second imbalance voltage difference exceeding the second balanced difference is obtained after the charging current drops to a taper current.

16. The method as claimed in claim 14, further comprising:

recording the voltage level of the second battery cell as a second voltage reference when starting to perform the second stage battery balance process; and controlling the balancing circuit to finish the second stage battery balance process when the voltage level of the second battery drops from the second voltage reference by a second adjustment target, wherein the second adjustment target is a difference between the second imbalance voltage difference and the second balanced difference.

17. The method as claimed in claim 14, wherein the second balanced difference is less than the first balanced difference.

18. The method as claimed in claim 14, wherein the second battery cell is the first battery cell.

19. The method as claimed in claim 11, wherein:

the charging transistor is controlled to charge the plurality of battery cells in the constant voltage charging mode when a total voltage level of the plurality of battery cells reaches a charging mode switch threshold after the charging transistor is enabled again.

20. The method as claimed in claim 19, wherein:

before the total voltage level reaches the charging mode switch threshold, the charging transistor to charges the plurality of battery cells in a constant current charging mode.

* * * * *